UNITED STATES PATENT OFFICE.

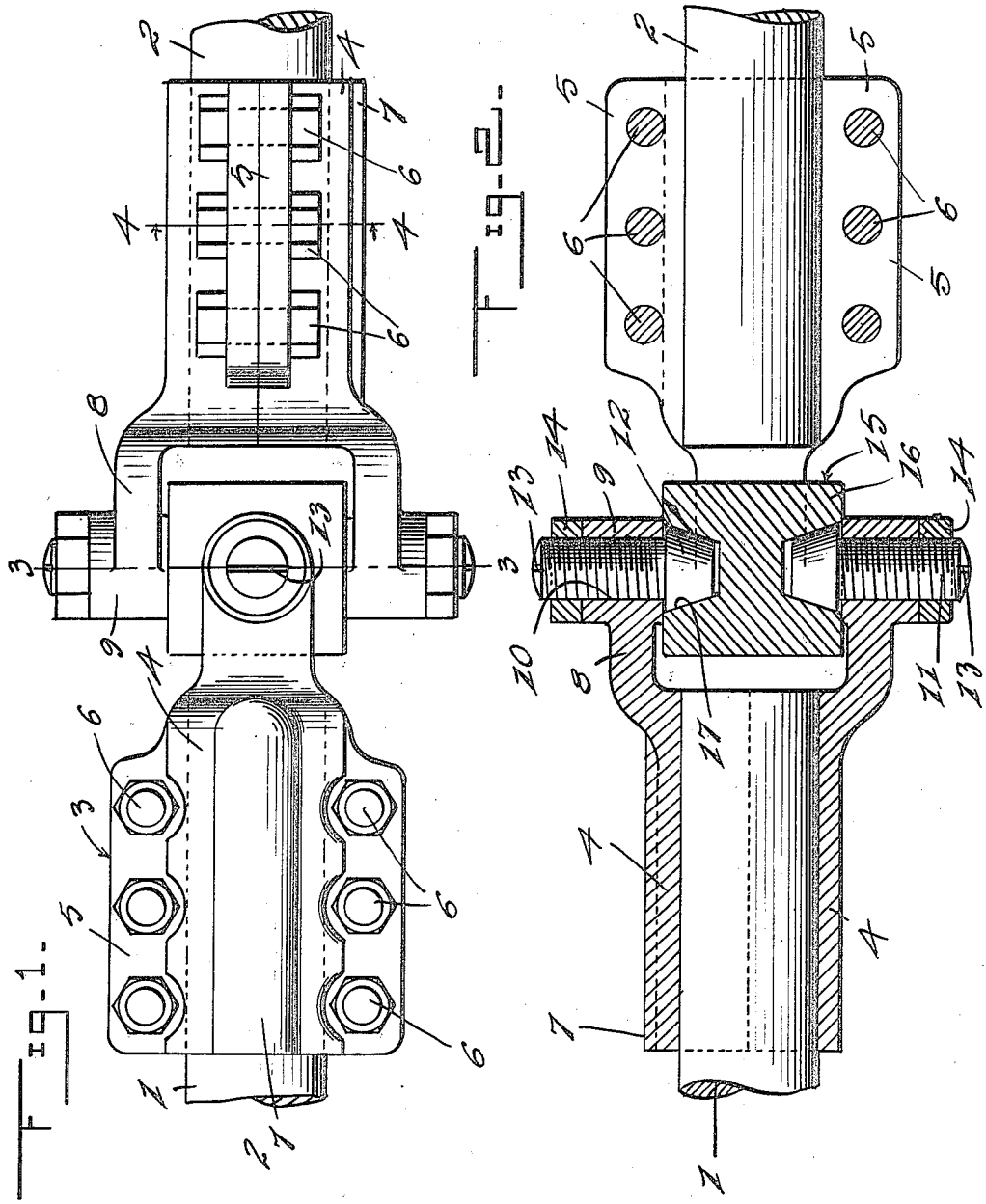

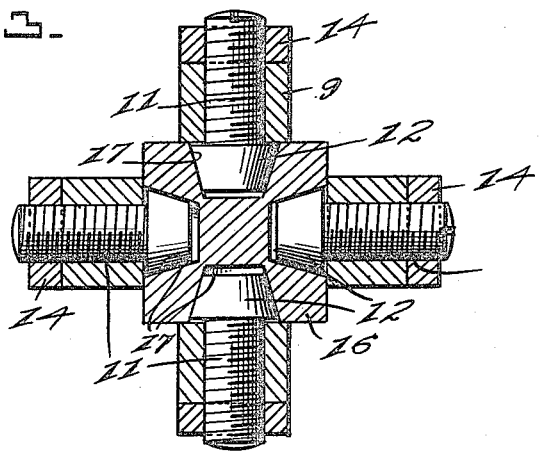
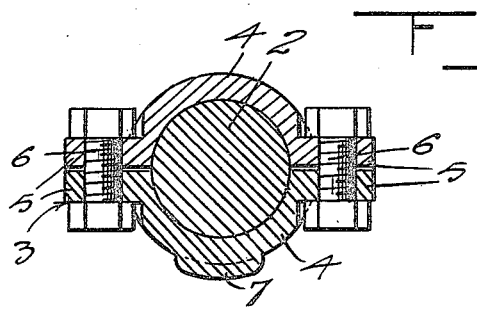
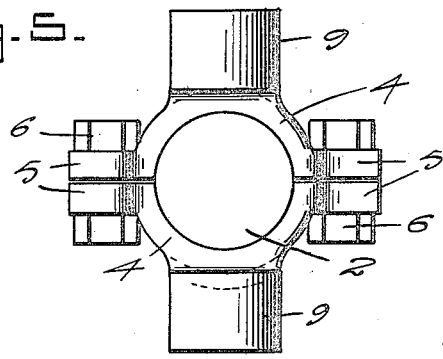

RICHARD A. HARTMANN, OF HARTFORD, CONNECTICUT.

UNIVERSAL JOINT.

1,232,540.  Specification of Letters Patent.  Patented July 10, 1917.

Application filed November 3, 1915. Serial No. 59,374.

*To all whom it may concern:*

Be it known that I, RICHARD A. HARTMANN, a subject of the Emperor of Germany, residing at Hartford, in the county of Hartford and State of Connecticut, have invented certain new and useful Improvements in Universal Joints; and I do hereby declare the following to be a full, clear, and exact description of the invention, such as will enable others skilled in the art to which it appertains to make and use the same.

This invention relates to new and useful improvements in universal joints and the principal object of the invention is to provide a universal joint which is so constructed as to enable the user to readily take up any wear in the working parts.

Another object of the invention is to provide a universal joint which may be readily assembled.

Still another object of the invention is to provide a universal joint having adjustable studs provided with tapered heads, which heads engage in tapered openings in the knuckle block so that upon moving the heads into or out of the openings, the proper operation of the device is insured.

With these and other objects in view, the invention consists in the novel combination and arrangement of parts which will be fully set forth in the following specification and accompanying drawings, in which:—

Figure 1 is a side view in elevation of a universal joint constructed in accordance with this invention.

Fig. 2 is a longitudinal sectional view on the line 2—2 of Fig. 1.

Fig. 3 is a vertical sectional view on line 3—3 of Fig. 1.

Fig. 4 is a transverse sectional view on line 4—4 of Fig. 1, and

Fig. 5 is an end view in elevation of one of the coupling members showing the knuckle block removed.

Referring to the drawings, the numeral 1 designates one of the shafts to be coupled by the universal joint, while the numeral 2 designates the coöperating shaft. The sleeve or coupling members designated generally by the numeral 3 consists of identically constructed parts, each of which comprises a transversely extending semi-cylindrical body portion 4, the side edges of which are formed with the flanges 5, which flanges are provided with openings for the reception of the bolts 6 and the openings are arranged to aline with the openings in the flanges on the opposite body portion so that when the bolts are passed through the openings and the nuts threaded thereon, a sleeve will be formed for the reception of the end of either of the shafts 1 or 2. A suitable struck up portion 7 is formed centrally of the body 4 and this struck up portion assists the body in gripping the shaft and frictionally engaging the same so as to hold the shaft and sleeve against relative rotation. Formed at the extreme forward end of each body is an extension 8, which is offset from the plane of the body and carries at its outer end a hub 9 provided with an internally screw threaded opening 10 through which the pivot studs extend.

Each of the pivot studs comprises a threaded shank 11 formed at its inner end with a tapered head 12, the taper of which conforms to the taper of the opening in which the studs seat. The outer ends of these studs are provided with slots 13 for the reception of the blade of a screw driver and a suitable locking nut 14 is threaded on each stud to lock the same against accidental rotation.

The knuckle block used in connection with the device is designated generally by the numeral 15 and comprises the cubical body 16, four of the faces of which are provided with the tapered bores 17 which extend to a point near the center of the block and are so shaped as to fit the head 12 of the stud. These bores 17 receive the heads of the studs and it will be apparent that the taper of the heads and bores allow for the adjustment of the studs in order to take up any loss of motion in the joint due to the wear of the working faces.

In the operation of the device it will be noted that the studs are first placed in position in the hubs 9 and the coöperating members 4 of the sleeve 3 are then assembled over the ends of the shafts 1 and 2. The nuts are then placed on the bolts 6 so that the sleeves firmly clamp on to the shaft and frictionally engage the same so that the shafts cannot turn without turning the sleeve and when assembled in this manner, it will be seen that the heads 12 of the studs will extend into the bores 17 in the knuckle blocks 15 and the lock nuts 14 are then loosened allowing the operator to insert a screw driver in the slot 13 of the studs so as to adjust the same to insure the proper fitting of the head 12 within the bore 17. The lock nuts 14 are then tightened and it will be seen that the joint will be ready for use. Should lost motion occur within the joint, it will be apparent that by loosening the nuts 14 and taking a slight turn of the studs and again tightening the nut, the head may be moved inwardly toward the center of the knuckle block, thereby taking up the lost motion and wear in the various parts and insuring a smooth joint at all times.

While in the foregoing there has been shown and described the preferred embodiment of this invention, it is to be understood that such changes may be made in the combination and arrangement of parts as will fall within the spirit and scope of the appended claim.

What is claimed is:

A universal joint comprising a pair of members, arms carried by each member, a block having tapered recesses, and pins having tapered heads located in said recesses and adjustably connected to the arms, the adjustable connection between the pins and arms permitting wear on the heads and walls of the recesses to be taken up and the simultaneous centering of the block.

In testimony whereof I affix my signature in presence of two witnesses.

RICHARD A HARTMANN.

Witnesses:
LILLIAN M. HALL,
ALBERT C. BILL.